United States Patent
Ardisana, II et al.

(10) Patent No.: US 12,181,732 B2
(45) Date of Patent: Dec. 31, 2024

(54) MODULAR EYEWEAR TEMPLE

(71) Applicant: Snap Inc., Santa Monica, CA (US)

(72) Inventors: John Bernard Ardisana, II, Torrance, CA (US); Yoav Ben-Haim, Culver City, CA (US); Teodor Dabov, Los Angeles, CA (US); Varun Sehrawat, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 292 days.

(21) Appl. No.: 16/793,414

(22) Filed: Feb. 18, 2020

(65) Prior Publication Data

US 2020/0271961 A1 Aug. 27, 2020

Related U.S. Application Data (60) Provisional application No. 62/808,913, filed on Feb. 22, 2019.

(51) Int. Cl.
*G02C 11/00* (2006.01)
*G02C 11/04* (2006.01)

(52) U.S. Cl.
CPC .............. *G02C 11/10* (2013.01); *G02C 11/04* (2013.01); *G02C 2200/08* (2013.01)

(58) Field of Classification Search
CPC .... G02C 11/10; G02C 5/146; G02C 2200/08; G02C 11/04; G02C 5/143; G02C 5/14
See application file for complete search history.

(56) References Cited

U.S. PATENT DOCUMENTS

| | | | | | |
|---|---|---|---|---|---|
| 1,936,319 | A | * | 11/1933 | Wingate | G02C 5/08 351/63 |
| 3,035,127 | A | * | 5/1962 | Strzalkowski | G02C 11/06 381/23.1 |
| 3,883,701 | A | * | 5/1975 | Delorenzo | G02C 11/06 381/327 |

(Continued)

FOREIGN PATENT DOCUMENTS

| | | | |
|---|---|---|---|
| CN | 202033547 U | * | 11/2011 |
| CN | 202110334 U | | 1/2012 |

(Continued)

OTHER PUBLICATIONS

International Search Report and Written Opinion for International Application No. PCT/US2020/018598, dated May 20, 2020 (May 20, 2020)—14 pages.

(Continued)

*Primary Examiner* — Christopher Stanford
(74) *Attorney, Agent, or Firm* — CM Law; Stephen J. Weed (57) ABSTRACT

Eyewear that includes a frame supporting an optical element. The frame has a first side and a second side. The eyewear also includes a temple adjacent the first side of the frame. The temple includes a first portion adjacent the frame and a second portion releasably connected to the first portion. An electronic device is provided in the releasable second portion. The electronic device may be passive or active, such as a battery configured to power the eyewear. The electronic device may communicate with an electronic component in the first portion, and may also operate independently when the second portion is removed.

14 Claims, 10 Drawing Sheets

(56) References Cited

U.S. PATENT DOCUMENTS

| | | | | |
|---|---|---|---|---|
| 4,756,605 A * | 7/1988 | Okada | G02C 7/101 | 351/44 |
| 6,163,926 A * | 12/2000 | Watanabe | G02C 5/22 | 351/153 |
| 6,293,673 B1 * | 9/2001 | Hirschman | G02C 5/143 | 351/123 |
| 6,582,075 B1 * | 6/2003 | Swab | G02C 11/10 | 351/158 |
| 6,929,365 B2 * | 8/2005 | Swab | H04W 52/248 | 351/158 |
| 7,607,775 B2 * | 10/2009 | Hermanson | G02C 11/04 | 362/208 |
| 7,731,354 B1 * | 6/2010 | Kwan | G02C 5/08 | 351/137 |
| 7,946,705 B1 * | 5/2011 | Hsu | G02C 11/04 | 351/158 |
| 7,997,724 B1 * | 8/2011 | Hsu | G02C 11/04 | 351/158 |
| 8,109,629 B2 * | 2/2012 | Howell | G02C 5/146 | 381/381 |
| 8,235,524 B2 * | 8/2012 | Waters | G02C 11/04 | 351/158 |
| 8,465,151 B2 * | 6/2013 | Howell | G02C 5/143 | 351/158 |
| 8,485,682 B2 * | 7/2013 | Beiner | G02C 11/04 | 351/158 |
| 8,491,118 B2 * | 7/2013 | Waters | G02C 11/04 | 351/158 |
| 8,514,097 B2 * | 8/2013 | Boise | G09F 27/00 | 340/815.45 |
| 8,545,012 B2 * | 10/2013 | Waters | G02C 11/04 | 351/158 |
| 8,783,861 B2 * | 7/2014 | Blum | G02C 5/146 | 351/110 |
| 8,801,174 B2 * | 8/2014 | Willey | G02C 5/146 | 351/158 |
| 8,979,259 B2 * | 3/2015 | Haddock | G02C 5/2272 | 351/158 |
| 8,979,295 B2 * | 3/2015 | Waters | A42B 1/242 | 351/158 |
| 9,122,083 B2 * | 9/2015 | Blum | G02C 7/081 | |
| 9,921,420 B2 * | 3/2018 | Bella | G02C 11/08 | |
| 9,952,452 B1 | 4/2018 | Hanover et al. | | |
| 9,971,169 B1 * | 5/2018 | Lin | G06F 1/163 | |
| 9,971,171 B1 * | 5/2018 | Lin | H01M 50/247 | |
| 10,268,276 B2 * | 4/2019 | Fisher | H04N 5/23238 | |
| 10,768,451 B1 * | 9/2020 | Carlson | F21V 23/0442 | |
| 10,935,815 B1 * | 3/2021 | Castañeda | F21V 23/0478 | |
| 2007/0200998 A1 * | 8/2007 | Schrimmer | G02C 11/04 | 351/158 |
| 2008/0106694 A1 * | 5/2008 | Blum | G02C 7/083 | 351/158 |
| 2010/0045928 A1 * | 2/2010 | Levy | G02C 11/10 | 351/158 |
| 2012/0050667 A1 * | 3/2012 | Wang | G02C 5/10 | 351/158 |
| 2015/0212329 A1 * | 7/2015 | Sugihara | G02B 27/0101 | 351/158 |
| 2016/0091731 A1 * | 3/2016 | Zhou | G02C 5/08 | 351/63 |
| 2017/0131575 A1 | 5/2017 | Howell et al. | | |
| 2017/0255029 A1 | 9/2017 | Klosinski, Jr. et al. | | |
| 2020/0233238 A1 * | 7/2020 | Ardisana, II | H02J 7/0045 | |

FOREIGN PATENT DOCUMENTS

| | | | | |
|---|---|---|---|---|
| CN | 203241650 U | * | 10/2013 | |
| CN | 105652473 A | * | 6/2016 | |
| EP | 2439580 A1 | | 4/2012 | |
| KR | 200480341 Y1 | * | 5/2016 | |
| WO | WO-2010066176 A1 | * | 6/2010 | G02C 11/04 |
| WO | WO-2015141405 A1 | * | 9/2015 | G02C 11/10 |
| WO | 2018145085 A1 | | 8/2018 | |
| WO | 2020154047 A1 | | 7/2020 | |

OTHER PUBLICATIONS

4th Chinese Office Action for Chinese Application No. 202080015362.1, dated Jan. 27, 2024 (Jan. 27, 2024)—7 pages (English summary—2 pages).

* cited by examiner

MODULAR EYEWEAR TEMPLE

CROSS-REFERENCE TO RELATED APPLICATIONS

This application claims priority to U.S. Provisional Application Ser. No. 62/808,913 entitled Modular Eyewear Temple, filed on Feb. 22, 2019, the contents of which are incorporated fully herein by reference.

TECHNICAL FIELD

The present subject matter relates to eyewear having electrical components, and techniques for exchanging electrical components in the eyewear.

BACKGROUND

Wearable devices are electronic devices incorporated into a garment or accessory that a user wears on their body. Presently, electronics enabled eyewear incorporates electronics and batteries for powering the electronics. The eyewear typically has electrical connectors such as cable connectors for charging the batteries. However, these electrical connectors often have large form factors that present challenges when incorporating into some contemporary eyewear designs, and require manipulation of the eyewear that can damage the eyewear.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

This description of the exemplary embodiments that follows is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

The term "on" means directly supported by an element or indirectly supported by the element through another element integrated into or supported by the element. Non-limiting examples shown in the drawings give directions or orientations of the eyewear and associated components only for illustration and discussion purposes. In operation for charging the battery, the eyewear may be oriented in other direction suitable to the particular application of the eyewear device, for example up, down, sideways, or any other orientation.

Additional objects, advantages and novel features of the examples will be set forth in part in the following description, and in part will become apparent to those skilled in the art upon examination of the following and the accompanying drawings or they may learn by production or operation of the examples. The methodologies, instrumentalities and combinations particularly pointed out in the appended claims assist in realizing and ascertaining the objects and advantages of the present subject matter.

FIGS. 1A-1D show eyewear 10 according to one example. The eyewear 10 includes a frame 12 having two sides, a first side 12A and a second side 12B. The frame 12 supports at least one optical element 18, including optical element 18A on the first side 12A. The optical element 18A may be, for example, a lens, a transparent piece of glass or plastic, a screen, a projector, a display, or other device for presenting visual images and/or through which a user may perceive visual images. Although shown as having one optical element, the frame 12 can include other arrangements, such as two optical elements 18A and 18B on the first and the second sides 12A and 12B, respectively, (FIG. 1D) or may not include any optical element 18 depending on the application or intended user of the eyewear 10. The first side 12A of the frame 12 may be dimensioned to accommodate various electronic components 24, such as a battery 25, a wireless transceiver, a data storage device, and a processor (see FIG. 5 and accompanying description).

The eyewear 10 also includes a temple 14A adjacent the first side 12A of the frame 12. The temple 14A includes a first portion 15A and a second portion 17A, which second portion 17A releasably connects to the first portion 15A. In one example, the first portion 15A is integrally formed with the frame 12. In another example, the first portion 15A connects to the frame 12 via a hinge 16A (FIG. 1D). The first portion 15A of the temple 14A includes an attachment point 13 where the first portion 15A of the temple 14A attaches to the second portion 17A. In one state (a concealed state; FIG. 1B), the second portion 17A is connected to the first portion 15A of the temple 14A at the attachment point 13 such that it covers an electrical connector 28 embedded within the first portion 15A. In another state (an exposed state; FIG. 1C), the second portion 17A is released/removed from the first portion 15A of the temple 14A at the attachment point 13 to expose the electrical connector 28. In one example, the second portion 17A moves in a direction along a connection axis, e.g., an X-axis location coordinate (FIG. 1C) resulting in the exposed state.

In one example, the eyewear 10 includes an electronic device 30 embedded in the second portion 17A of the frame 12. The eyewear 10 also includes an electrical connector 26 having a mechanical portion and an electrical portion (FIG. 1C) extending from the second portion 17A of the temple 14A. The electrical connector 26 functions to both mechanically connect the second portion 17A of the temple to the first portion 15A at the attachment point 13 resulting in the concealed state (FIG. 1B), and also to electrically connect the electronic device 30 to electronic components 24 in the frame 12. This second portion 17A is thus considered electrical and smart, as opposed to the term dumb which refers to not having any electronic components.

The mechanical portion of electrical connector 26 functions to enable disconnection of the second portion 17A of the temple from the first portion 15A at the attachment point 13 resulting in the exposed state (FIG. 1C). In one example, the electrical connector 26 is configured to mate with the electrical connector 28 with a friction fit retaining the mechanical portion of electrical connector 26 within the electrical connector 28 and, thereby, the second portion 17A attached to the first portion 15A. Some examples of the mechanical portion of the electrical connector 26 includes a joint-type connection, a snap feature, a twist to lock connector, a release mechanism, a magnet etc.

The electrical portion of electrical connector 26 comprises multiple electrical conductors 32 that function to electrically connect the electronic device 30 embedded in the second portion 17A to the electronic components 24 in the frame 12. The electronic device 30 may comprise of an active and/or passive electrical component or components. An example of an active electrical component is a battery configured to power the electronic components 24, a flashlight, a camera, a sensor, a microphone, and an augmented reality (AR) device such as sensors and/or a display. An example of a passive electrical component is a non-amplified speaker.

When the electronic device 30 comprises a battery, the battery may be recharged by removal of the second portion 17A from the first portion 15A and connecting the second electrical connector 26 of the second portion 17A to a charging source (not shown) via the electrical conductors 32 of electrical connector 26. Additional second portions 17A can operate as spares. In this example the electrical conductors 32 provide a power and ground connection. This example alleviates the need to connect a power source to the frame 12 for charging proximate the optical elements 18, and also reduces the chance for the optical elements 18 or frame 12 to be damaged during manipulation of the frame 12 during charging. The user may have one or more second portions 17A such that the unused second portion 17A is a spare which can be easily interchanged to provide extended operating life of the frame 12, such as between charges. The second portion 17A can have different size batteries, such that a user can select and use a second portion 17A with a desired battery capacity and having a weight acceptable to the user.

The electronic device 30 can comprise of any number of different electrical components as previously discussed. For example, electronic device 30 can comprise a battery such as shown at 30A in FIG. 1E where the electrical conductors 32 serve as positive and negative leads to power electronic components 24. In another example, the electronic device 30 can comprise a light 30B, such as a light emitting diode (LED), and an associated power switch 34 on an inside of the second portion 17A. The light 30B can be powered by a battery in the second portion 17A so that the second portion 17A can function as a standalone light when removed from first portion 15A, or by electronic components 24 via electrical connectors 26 and 28. In another example, electronic device 30 can comprise a speaker such as shown at 30C in FIG. 1G where the electrical conductors 32 serve as positive and negative leads that communicate sound signals from electronic components 24. The electronic device 30 can comprise a camera as shown at 30D in FIG. 1H and configured to capture images on the side of the user and assist in rendering 270 degrees of view. The electronic device 30 can comprise other components such as those supporting augmented reality (AR) features. Thus, limitation to the shown examples of electronic device 30 is not to be inferred.

Examples of the snap feature includes a snap-on connector, which is a coupling mechanism including corresponding protrusion and indentations on respective portions to enables connecting/mating with a straight push and disconnecting/unmating with a straight pull. A twist to lock connector is a coupling mechanism in which the connector connects with a straight push and then a twist to lock the second portion in place, and disconnects by twisting in an opposite direction to unlock the second portion from the first portion and then unmates with a straight pull. A release mechanism includes a connector that has a built-in lock/release collar to securely lock mated connectors and to enable quick disconnection by simply pulling on the release collar. For a magnet connection, the first or second portion of the temple may include a first magnet and the second or first portion of the temple may include metal or a second magnet. The second magnet is oriented to attract the first magnet in order to secure the second portion to the first portion in the concealed state while allowing disconnection of the second portion from the first portion to achieve the exposed state. Various other suitable connection techniques will be understood from the description herein.

Figure 1A:
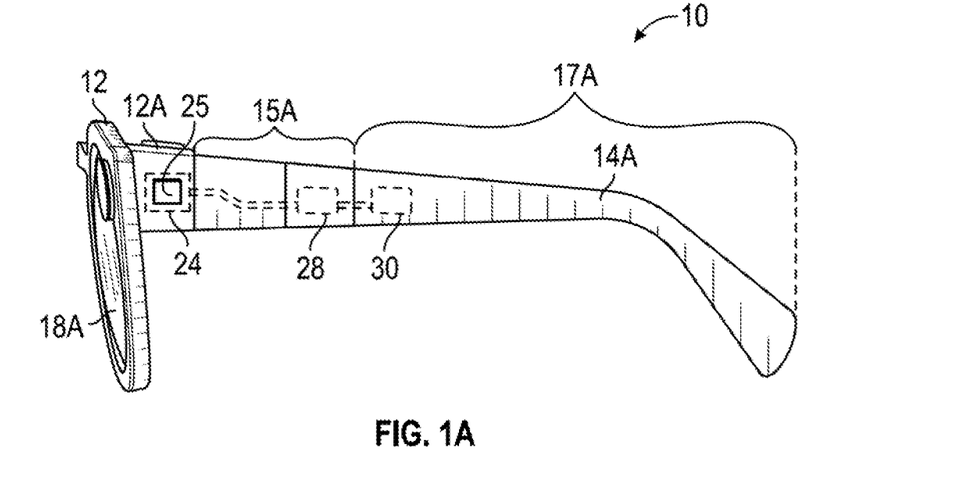
FIG. 1A is a side view of electronics enabled eyewear having an electrical component residing in a removable portion of a temple.
Figure 1B:
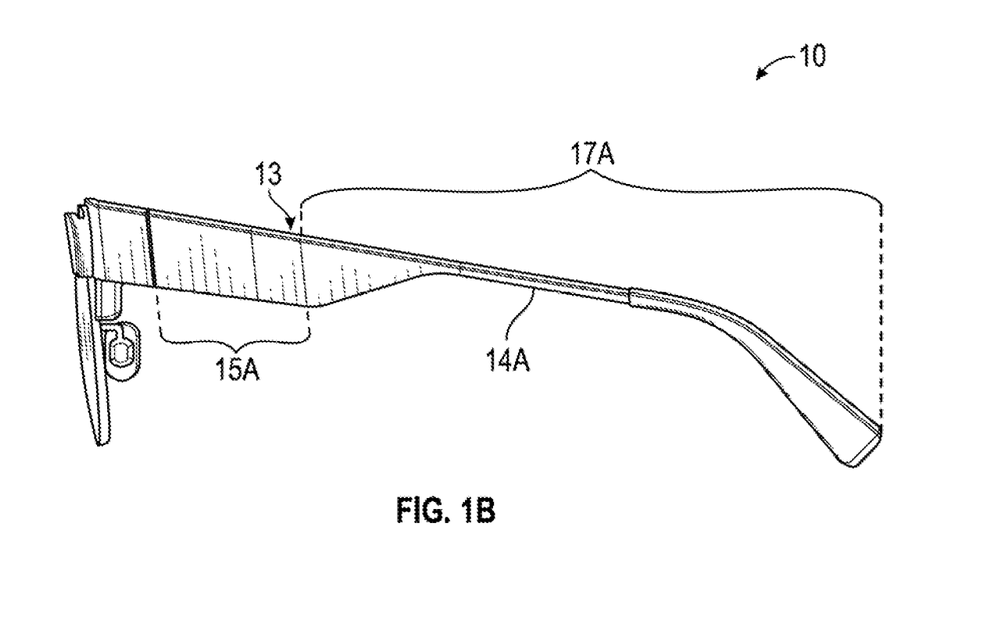
FIG. 1B is the side view of the eyewear of FIG. 1A with an electronic connector concealed from an exterior of the eyewear.
Figure 1C:
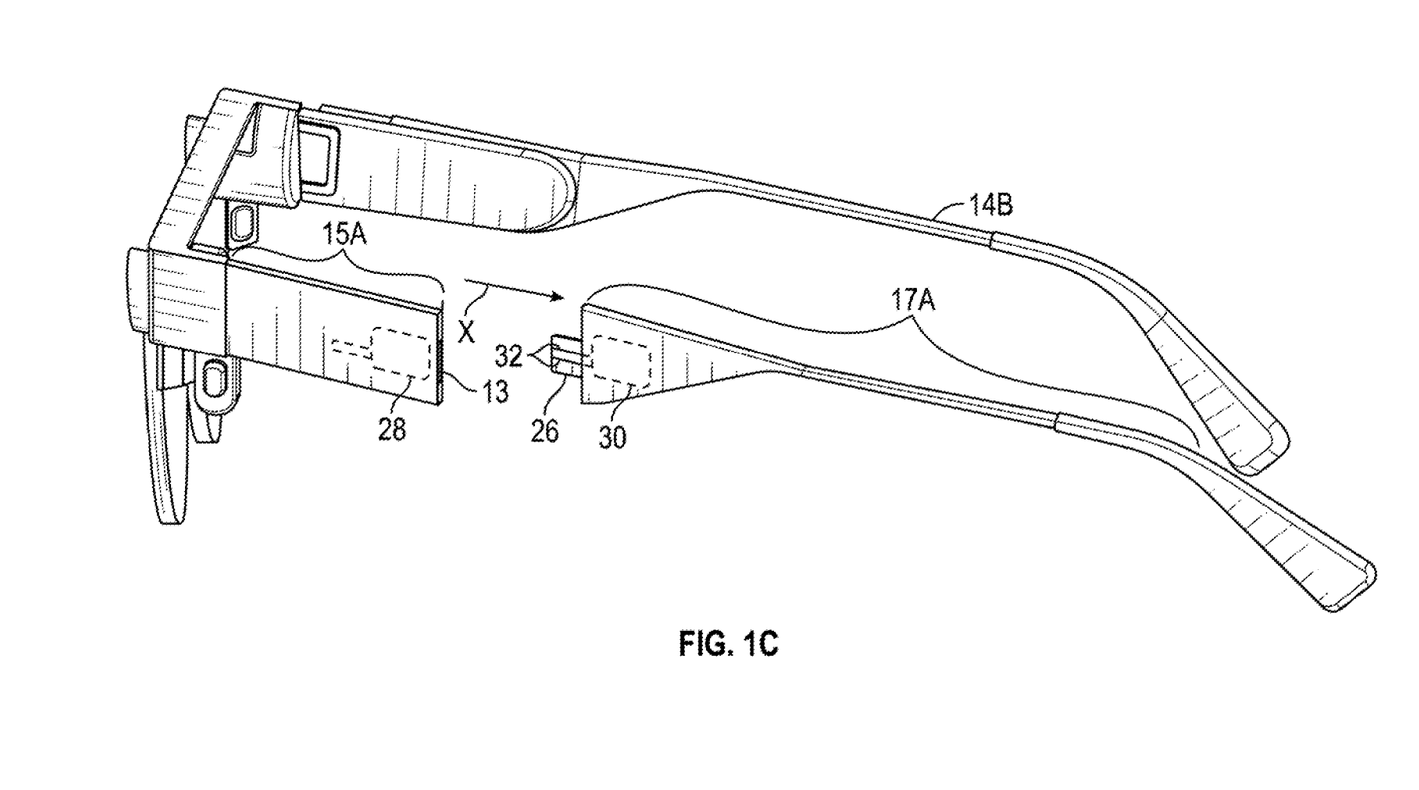
FIG. 1C is a disassembled side view of the eyewear of FIG. 1B with a portion of the temple removed from the eyewear, the removed portion of the temple having an electrical device and an electrical connector having conductors.
Figure 1D:
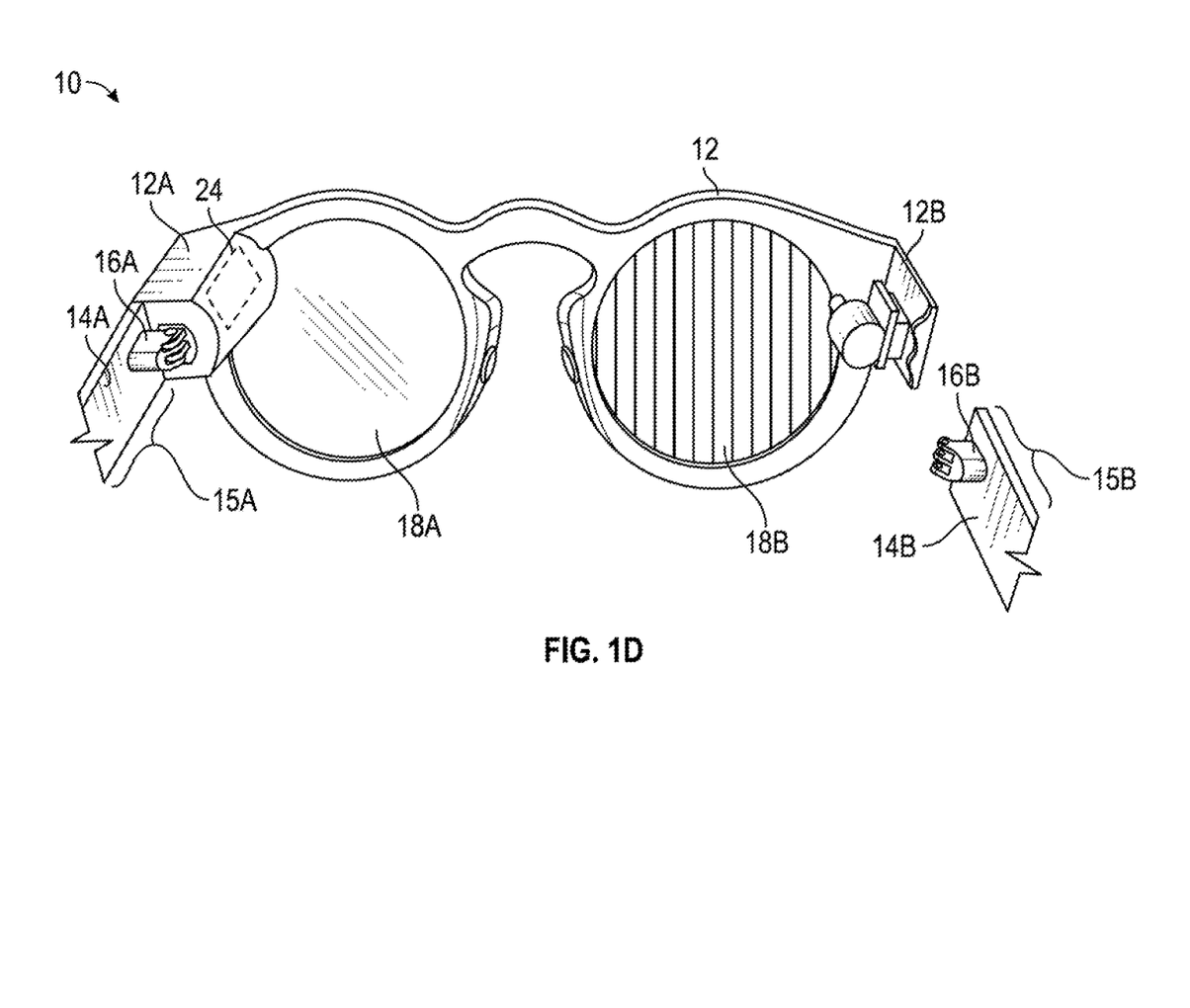
FIG. 1D is a partial rear view of the eyewear of FIG. 1A.
Figure 1E:
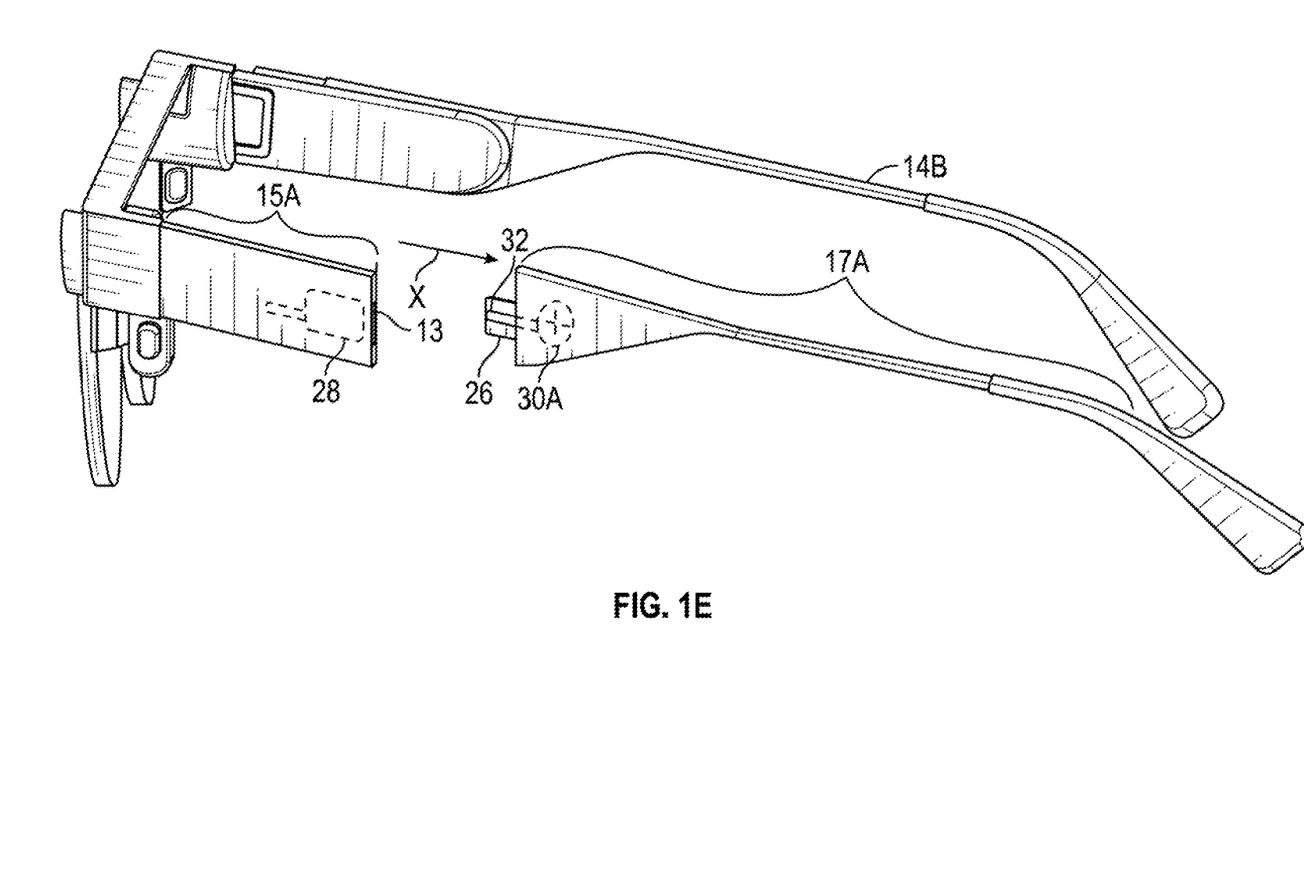
FIG. 1E is an example of the electrical device comprising a battery.
Figure 1F:
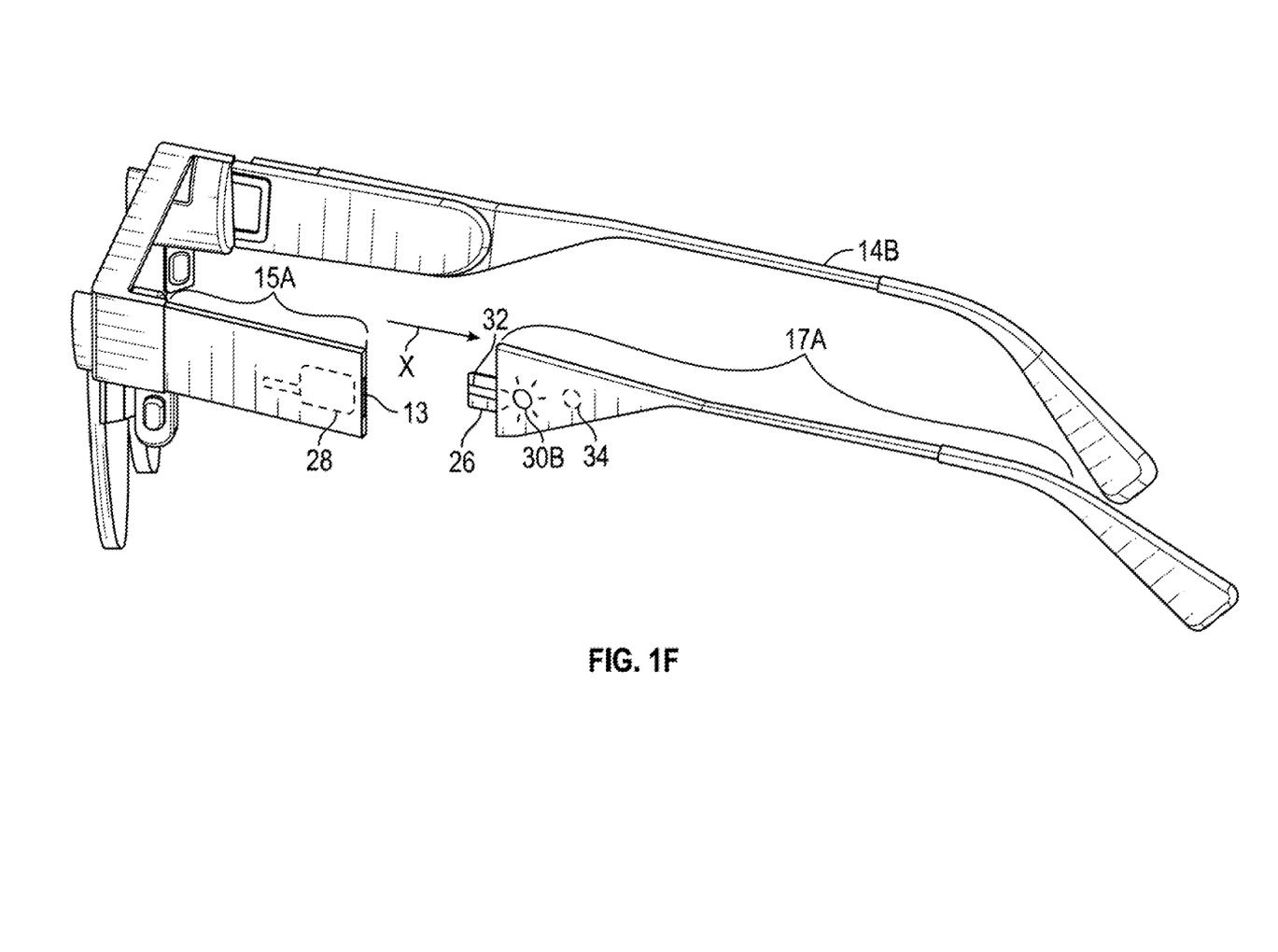
FIG. 1F is an example of the electrical device comprising a light.
Figure 1G:
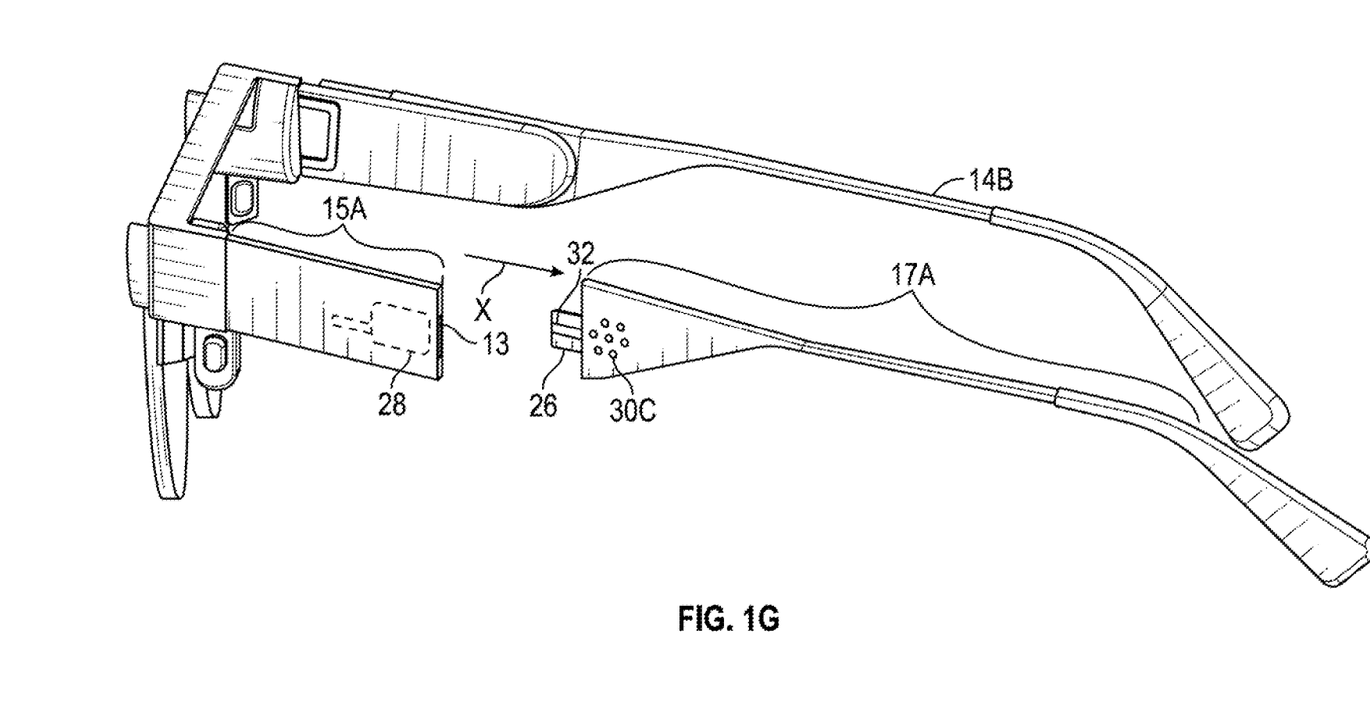
FIG. 1G is an example of then electrical device comprising a speaker.
Figure 1H:
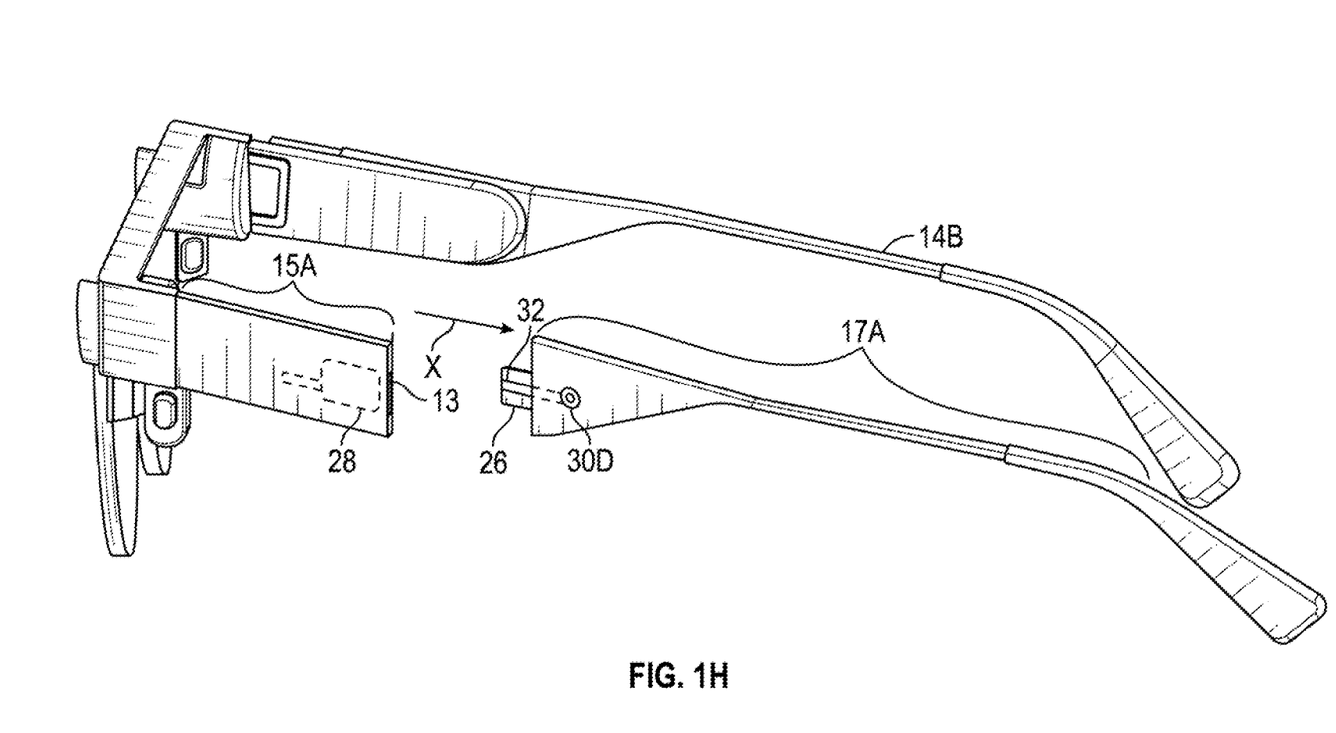
FIG. 1H is an example of the electrical device comprising a camera.

Eyewear 10 in FIGS. 1A and 1B also has a second temple 14B adjacent to the second side 12B of the frame 12 (FIG. 1C). In one example, the second temple 14B may be a single piece that does not include a releasable portion and is dumb. In another example, the second temple 14B may have the same configuration as the first temple 14A and have a first portion 15B, and a second portion 17B that is releasably attached to the first portion 15B (FIG. 1D). In one example, the second portion 17B may also comprise a respective electronic device 30 which may or may not be configured to communicate with the electrical components 24 and is also smart. In accordance with this example, the outer dimensions of the second temple 14B may be the same as the outer dimensions of the first temple 14A so that the eyewear 12 has symmetry. In one example, each of the first portions 15A and 15B of the temples 14A and 14B, respectively, are attached to the opposing sides 12A and 12B, respectively, of the frame 12 by first and second hinges 16A and 16B respectively (FIG. 1D).

In one example, the mechanical portion of electrical connector 26 is dimensioned to mate with the electrical connector 28, and also disconnect from the electrical connector 28 of the first portion 15A of the temple 14A in the exposed state, which results in the electrical connector 26 being exposed from the exterior of the eyewear 10 (FIG. 1C). The electrical connector 26 is accessible to a user in the exposed state and is inaccessible to the user in the concealed state. For example, in the exposed state (FIG. 1C), the user can connect a power component (not shown) to the electrical connector 26, which functions to deliver power to the electronic device 30 in the second portion 17A. In another example, the electrical connector 26 connects to the electrical connector 28 of the first portion 15A of the temple 14A in the concealed state, which results in both of the electrical connector 26 and the electrical connector 28 being concealed from an exterior of the eyewear 10 (FIG. 1B). In one example, the user wears the eyewear 10 in the concealed state. In one example, the electrical connector 26 and the electrical connector 28 are each a cable type connector, such as a USB type A, B, or C cable connector, each being mechanically and electrically mating to each other.

Figure 2A:
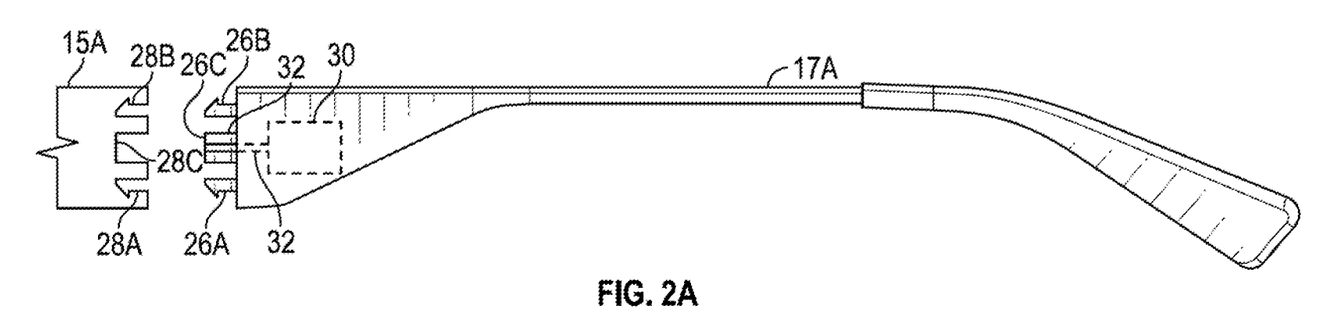
FIGS. 2A, 2B, and 2C are side views of eyewear temples depicting examples of insertion of one portion of the temple into another portion of the temple.
Figure 2B:
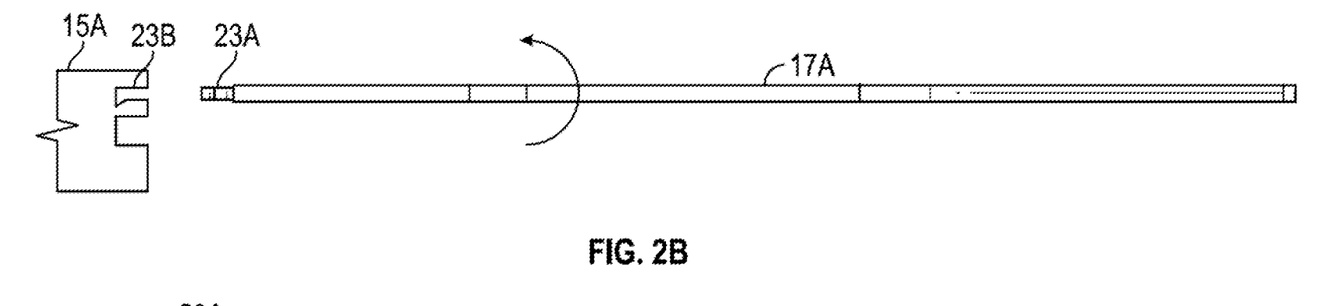
Figure 2C:
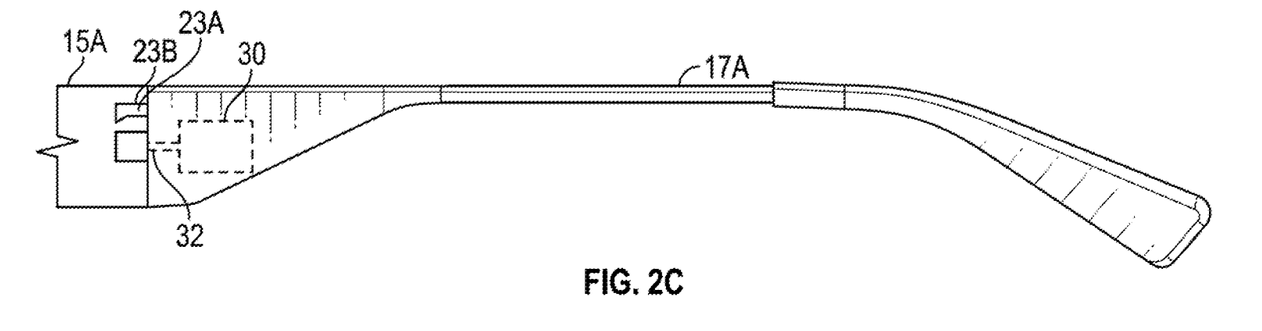

FIGS. 2A, 2B and 2C are side views depicting various examples of insertion of the second portion 17A of the temple 14A into the first portion of the temple 14A as described in detail herein below. In one example, the electrical connector 26 includes snaps 26A and 26B, and electrical interface 26C, which are integrally attached to the second portion 17A of the temple 14A (FIG. 2A), and the electrical connector 28 of first portion 15A defines grooves 28A and 28B for receiving and accommodating the snaps 26A and 26B, respectively, and an electrical interface 26C for receiving and connecting to electrical interface 28C (FIG. 2A). In the example of FIG. 2A, the second portion 17A is inserted directly into the first portion 15A along a longitudinal insertion axis. Specifically, the snaps 26A and 26B are inserted into their corresponding grooves 28A and 28B (FIG. 2A).

In another example, the second portion 17A is first inserted into the first portion 15A along a longitudinal insertion axis (FIG. 2B) and then the second portion 17A is rotated to lock the second portion 17A in place (FIG. 2C) to conceal the electrical connector 28 as well as electrical connector 26. Specifically, a protrusion 23A is initially inserted into a groove 23B (FIG. 2B). The second portion 17A is then rotated, causing the protrusion 23A to lock into place within the groove 23B (FIG. 2C) in order to firmly connect the second portion 17A to the first portion 15A of the temple 14A and electrically connect electrical connectors 26 and 28. The process may be reversed by rotating the second portion 17A/protrusion 23A in the opposite direction to unlock the protrusion 23A from the groove 23B and then pulling the second portion 17A out in order to remove the second portion 17A from the first portion 15A of the temple 14A.

Figure 3:
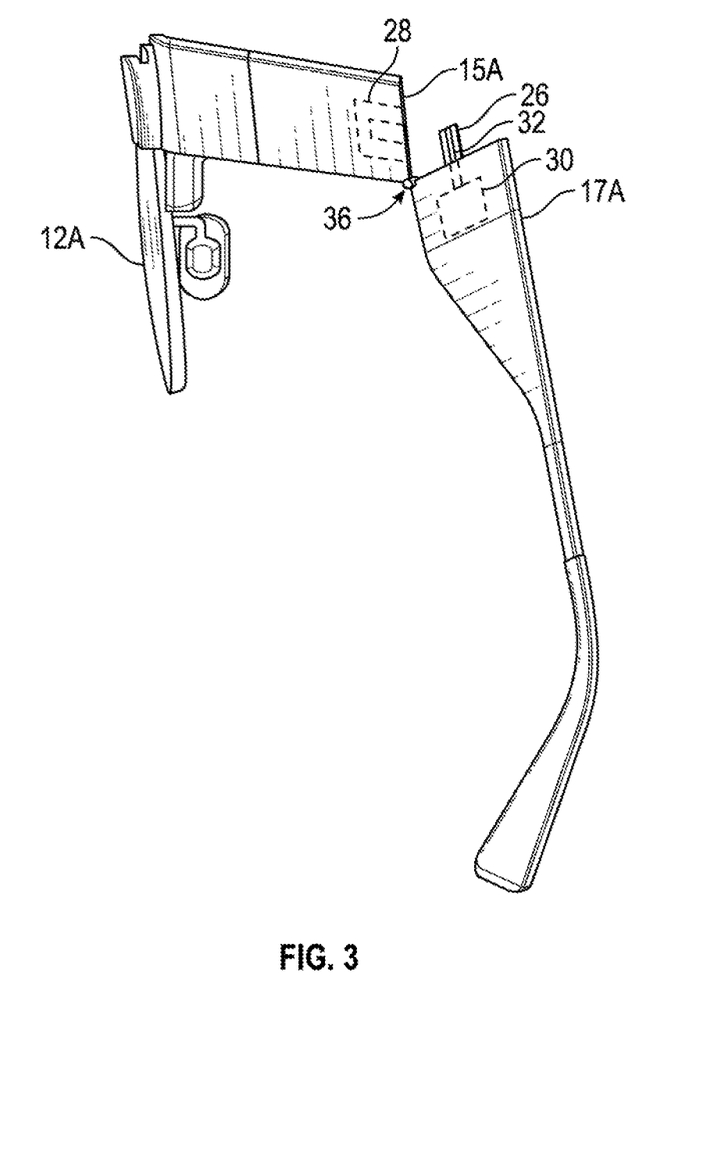
FIG. 3 is a side view of an example of a pivotal connection of a second portion of the temple with respect to a first portion of the temple connected to a frame.

In another example, the second portion 17A of the temple 14 is pivotably connected to the first portion 15A by a hinge 34 (FIG. 3) such that the second portion 17A is movable with respect to the first portion 15A between concealed and exposed states. For example, in the exposed state, the second portion 17A is moved away from the first portion 15A about an axis of rotation defined by the hinge 34, which disconnects the second portion 17A from the first portion 15A of the temple and exposes the electrical connector 26 such that the electrical device 30 can be charged by a power source (not shown). In the concealed state, the second portion 17A connects to the first portion 15A about the axis of rotation defined by the hinge 36 to conceal electrical connectors 26 and 28.

Figure 4:
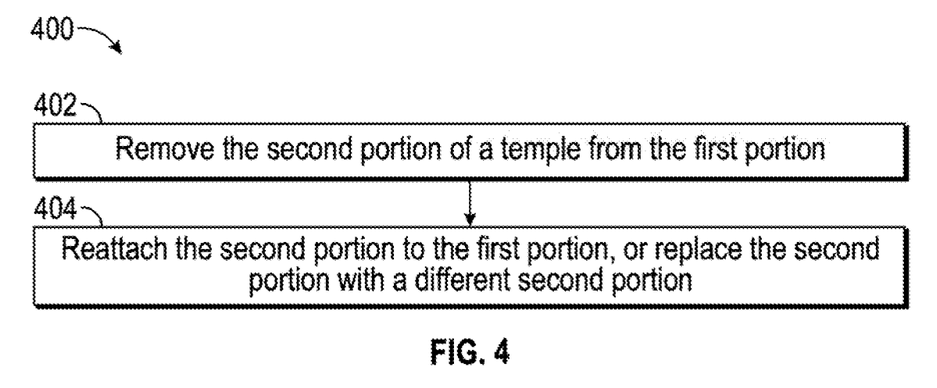
FIG. 4 is a flowchart depicting an example of steps for charging an eyewear battery.

FIG. 4 is a flowchart depicting an example of interchanging different second portions 17A, such as using a second portion having a battery to power the electronic component 24, or operating the second portion as a standalone smart device. The steps are described with reference to the eyewear depicted in FIGS. 1A-1H. One of skill in the art will understand from the description herein that the method may be implemented using other types of eyewear with different connectors for exchanging second temple portions 17A.

At step 402, place the temple 14A in an exposed state by moving the second portion 17A of the temple 14A in the first direction to completely disconnect the second portion 17A of the temple 14A from the first portion 15A (FIG. 1C).

At step 404, reattach the second portion 17A or replace the second portion 17A with another second portion configured for attachment to the first portion 15A. In one example, the second portion 17A includes a power component and attaching the second portion 17A connects the power component to the electrical connector 28 via electrical connector 26 to transmit power through the electrical conductors 32 of electrical connector 26 to supply power to the eyewear 10. In another example, replace the second portion 17A with a different second portion 17A, such as one having a fully charged battery, and/or having a larger capacity battery. In accordance with this example, a user may have multiple second portions (e.g., a bulky second portion with a large capacity battery when available power is of concern and a sleeker second portion with a smaller capacity battery when available power is not of concern) or may upgrade by purchasing a new second portion. In another example, replace the second portion 17A with another second portion 17A having an LED and battery (e.g., which can operate as a standalone flashlight), a speaker, a sensor, a camera, and/or an AR component.

Figure 5:
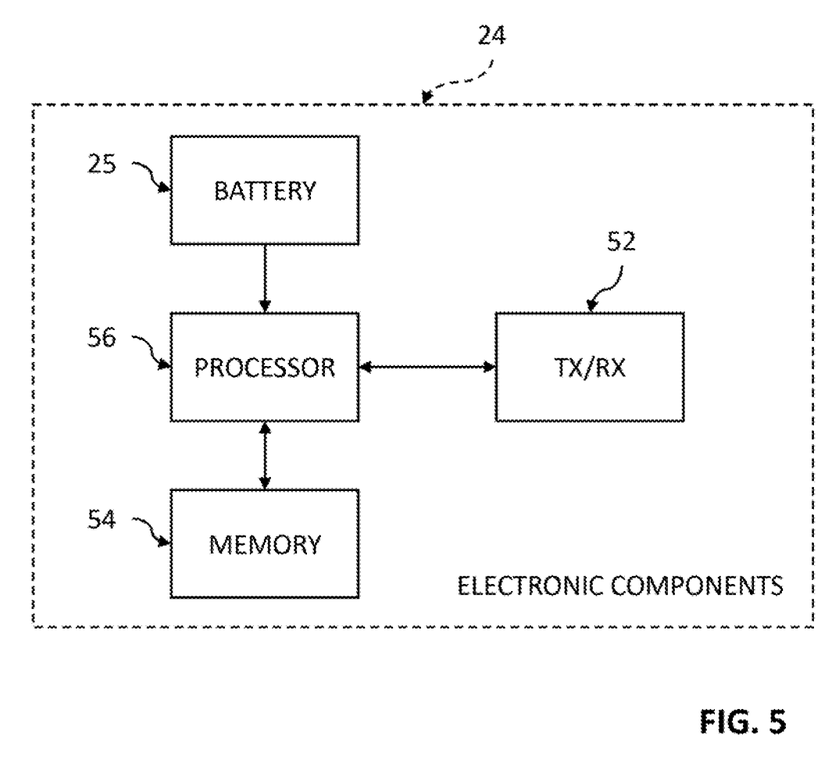
FIG. 5 is a block diagram depicting electronic components for use in the eyewear of FIG. 1A.

FIG. 5 depicts example electronic components 24 for use in eyewear 10. The illustrated electronic components 24 include the battery 25, a wireless transceiver 52, a data storage device 54, and a processor 56. Wireless transceiver 52 enables communication between the eyewear 10 and external devices, e.g., a mobile device, a Wi-Fi hotspot, or other communication device. Data storage device 54 may include static and/or dynamic memory. Data storage device 54 stores information received from processor 56 and includes instructions for execution by processor 56 to implement functionality of eyewear 10. Processor 56 receives power from battery 25 and executes instructions stored in data storage device 54 to perform functionality of eyewear 10 such as controlling operation of eyewear 10 and communicating with external devices via transceiver 52.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. Eyewear comprising:
   a frame configured to support an optical element, wherein the frame has a first side and a second side;
   a processor disposed in the frame and configured to operate the eyewear;
   a first temple adjacent the first side of the frame, the first temple comprising a first portion adjacent the frame and a second portion releasably connected to the first portion by a hinge, wherein the first portion is interposed between the frame and the second portion, the first temple having a concealed state and an exposed state, wherein the second portion is curved in a downward direction to conform to an ear of a user when the eyewear is worn by the user;
   an electronic device disposed in the releasably connected second portion;
   a first electrical connector coupled to the first portion of the first temple, and a second electrical connector coupled to the second portion of the first temple and to the electronic device, wherein the second electrical connector is configured to electrically connect with the first electrical connector;
   wherein the first electrical connector and the second electrical connector are configured to electrically connect the processor in the frame to the electronic device in the second portion of the first temple; and
   wherein the hinge is positioned on a bottom of the first temple to permit rotation of the first temple second portion in the downward direction with respect to the first portion.

2. The eyewear of claim 1, wherein the first electrical connector is embedded within the first portion of the first temple, such that the first electrical connector is concealed from an exterior of the eyewear in the concealed state of the first temple when the second portion covers the first electrical connector, and is exposed to the exterior of the eyewear in the exposed state of the first temple when the second portion does not cover the first electrical connector.

3. The eyewear of claim 2, wherein the second electrical connector is exposed from an exterior of the eyewear in the exposed state.

4. The eyewear of claim 1, wherein the electronic device is an active component.

5. The eyewear of claim 4, wherein the electronic device comprises a sensor.

6. The eyewear of claim 1, wherein the electronic device is a passive component.

7. The eyewear of claim 1, wherein the processor is configured to receive power from the electronic device in the releasably connected second portion.

8. The eyewear of claim 1, wherein the first and second electrical connectors are cable-type connectors.

9. The eyewear of claim 1, wherein the electronic device comprises a speaker.

10. The eyewear of claim 1, wherein the second portion further comprises a switch.

11. A method of configuring eyewear, the eyewear having a frame, a processor disposed in the frame and configured to operate the eyewear, a first temple comprising a first portion adjacent the frame, a second portion releasably connected to the first portion by a hinge and curved in a downward direction to conform to an ear of a user when the eyewear is worn by the user, wherein the hinge is positioned on a bottom of the first temple to permit rotation of the first temple second portion in the downward direction with respect to the first portion, wherein the first portion is interposed between the frame and the second portion, wherein the second portion is configured to rest above a user's ear when the eyewear is worn by a user, the method comprising:
   removing the second portion of the first temple from the first portion of the first temple by rotating the second portion downwardly, the first portion including a first electronic component coupled to a first electrical connector and the second portion including a second electronic component coupled to a second electrical connector configured to mate with the first electrical connector; and
   connecting the second portion of the first temple to the first portion of the first temple by rotating the second portion upwardly such that the processor communicates with the second electronic component.

12. The method of claim 11, wherein the second electrical connector comprises a battery, wherein the method includes recharging the battery, and then reattaching the second portion to the first portion.

13. The method of claim 11, wherein the second electronic component comprises a speaker, wherein the method further includes producing a sound with the speaker.

14. The method of claim 11, wherein the second portion further comprises a switch.

* * * * *